(12) United States Patent
Showen et al.

(10) Patent No.: US 8,134,889 B1
(45) Date of Patent: Mar. 13, 2012

(54) SYSTEMS AND METHODS FOR AUGMENTING GUNSHOT LOCATION USING ECHO PROCESSING FEATURES

(75) Inventors: Robert L. Showen, Los Altos, CA (US); Robert B. Calhoun, Oberlin, OH (US); Jason W. Dunham, San Francisco, CA (US)

(73) Assignee: ShotSpotter, Inc., Mountain View, CA (US)

( * ) Notice: Subject to any disclaimer, the term of this patent is extended or adjusted under 35 U.S.C. 154(b) by 0 days.

(21) Appl. No.: 13/012,781

(22) Filed: Jan. 24, 2011

Related U.S. Application Data (63) Continuation-in-part of application No. 12/573,775, filed on Oct. 5, 2009, now abandoned, which is a continuation of application No. 12/172,163, filed on Jul. 11, 2008, now Pat. No. 7,599,252, which is a continuation of application No. 11/546,529, filed on Oct. 10, 2006, now Pat. No. 7,474,589.

(51) Int. Cl.
*G01S 3/80* (2006.01)

(52) U.S. Cl. .......................... 367/127; 367/128; 367/906

(58) Field of Classification Search .................. 367/124, 367/127, 129, 906, 128
See application file for complete search history.

(56) References Cited

U.S. PATENT DOCUMENTS

| | | | |
|---|---|---|---|
| 5,586,086 A | 12/1996 | Permuy et al. | |
| 5,973,998 A | 10/1999 | Showen et al. | |
| 6,178,141 B1 | 1/2001 | Duckworth et al. | |
| 6,552,521 B1 | 4/2003 | Medelius et al. | |
| 6,847,587 B2 | 1/2005 | Patterson et al. | |
| 6,891,500 B2 | 5/2005 | Hall et al. | |
| 7,474,589 B2 | 1/2009 | Showen et al. | |
| 7,599,252 B2 | 10/2009 | Showen et al. | |
| 2008/0084788 A1 | 4/2008 | Showen et al. | |
| 2008/0279046 A1 | 11/2008 | Showen et al. | |
| 2010/0118658 A1* | 5/2010 | Showen et al. | ................ 367/127 |
| 2010/0195445 A1* | 8/2010 | Calhoun | ....................... 367/127 |

OTHER PUBLICATIONS

Li Cong, et al., "Hybrid TDOA/AOA Mobile User Location for Wideband CDMA Cellular Systems", IEEE Transactions on Wireless Communications, vol. 1, No. 3, Jul. 2002, pp. 439-447.
Proietti, Mario, "Carrier Choices in Location: The System Integrator's View," GPS World, Mar. 2002, pp. 23-28.
Image File Wrapper of U.S. Appl. No. 11/546,529, filed Oct. 2006 (prosecution of parent application, issuing as USP 7,474,589 listed above).
Image File Wrapper of U.S. Appl. No. 12/172,163, filed Jul. 2008 (prosecution of parent application, issuing as USP 7,599,252 listed above).
Image File Wrapper of U.S. Appl. No. 12/573,775, filed Oct. 2009 (prosecution of parent application).

\* cited by examiner

*Primary Examiner* — Daniel Pihulic
(74) *Attorney, Agent, or Firm* — DLA Piper LLP (US)

(57) ABSTRACT

Systems and methods are disclosed for processing weapon fire information such as gunfire. In one exemplary implementation, there is provided a method of processing gunshot information to determine source location information involving echo/reflection processing features. Moreover, the method may include processing gunshot information received from a source at a sensor having a reflecting surface at a given distance, processing direct arrival time and echo arrival time information, and determining source location information as a function of a virtual sensor calculated behind the surface.

20 Claims, 9 Drawing Sheets

SYSTEMS AND METHODS FOR AUGMENTING GUNSHOT LOCATION USING ECHO PROCESSING FEATURES

CROSS REFERENCE TO RELATED APPLICATION DATA

This is a continuation-in-part of application Ser. No. 12/573,775, filed Oct. 5, 2009 now abandoned, published as US2010/0118658A1, which is a continuation of application Ser. No. 12/172,163, filed Jul. 11, 2008, published as US2008/0279046A1, now U.S. Pat. No. 7,599,252, which is a continuation of application Ser. No. 11/546,529, filed Oct. 10, 2006, published as US2008/0084788A1, now U.S. Pat. No. 7,474,589, all of which are incorporated herein by reference in entirety.

BACKGROUND

1. Field

The present invention relates to processing weapon fire information such as gunfire, and, more particularly, to systems, methods, devices and computer-readable media associated with weapon fire location augmented by echo/reflection processing.

2. Description of Related Information

Measuring the locations of acoustic sources over an extensive area requires an array of sensors. One example of an outdoor array is an urban gunshot location system. An exemplary example of such a system is given in U.S. Pat. No. 5,973,998 "Automatic Real-Time Gunshot Locator and Display System," which describes the ShotSpotter® system.

In an urban setting, buildings cause refraction, reflection, and blockage of audio waves propagating from gunfire to the various sensors. Reflections (multipath) are usually not important to triangulation or multilateration if the direct path is also received, as subsequent impulses can be discarded. In traditional location systems these reflection hitherto fore have been ignored.

An attempt to mitigate blockage and bad effects from reflection is taught in U.S. Pat. No. 7,474,589 titled "Acoustic Location of Gunshots Using Combined Angle of Arrival and Time of Arrival Measurements," which is incorporated herein by reference in entirety and integrated with this application. Azimuthal sensors allow a fewer number of sensors to locate and confirm a location, and they can lift mathematical ambiguities for solutions where two distinct roots (location solutions) using arrival times only are present.

The use therein of "pseudo-sensors" to ease location computation is also contemplated in the present invention. Briefly, a pseudo-sensor is a useful computational algorithm that converts a location problem using input data consisting of a mixed set of times of arrival (ToA) and angles of arrival (AoA) into a set of only ToA values, allowing, e.g., use of multilateration computation methods Innovations consistent with concepts involving virtual sensor(s) using echoes are disclosed in this patent.

SUMMARY

Some exemplary systems, methods, devices/products and computer-readable media consistent with the innovations herein are directed to aspects of weapon fire processing augmented by echo processing.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various implementations and aspects of the present invention and, together with the description, explain the principles of the invention. In the drawings.

DETAILED DESCRIPTION OF EXEMPLARY IMPLEMENTATIONS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Aspects of the present disclosure describe how acoustically reflecting surfaces (buildings, barriers, roofs, or flat ground) may be utilized to process weapon fire information via creation/use of "virtual sensors." A virtual sensor may be created when a reflected waveform is observed from an echo path and the geometry of the reflecting surface is known. In some implementations, this additional path, e.g. when used with the direct path, often can emulate a larger array to give improved range and angular resolutions.

Two examples of advantageous virtual sensor geometries, provided for illustration not limitation, include a police car parked beside a building or an elevated sensor above a roof or flat ground. Given the building and police car sensor, for example, innovative processing may be enabled via creation of a virtual sensor behind the building so that a pair of sensors is now present enabling superior azimuthal resolution as well as potential calculation of the range to the source. The rooftop sensor when receiving sound from overhead and from a bounce can determine the vertical angle and range to the source.

In other implementations, if an acoustic sensor plus an optical sensor (which may be omni-directional) measuring the optical flash of a muzzle are used together, and the range is known, the angle to the source can be found according to virtual sensor innovations herein.

The innovations herein may be applied to further implementations, such as when a moving source produces a Doppler shift, i.e., wherein the frequency shifts of direct and reflected paths will be different. In some situations, here, the horizontal and vertical velocities of a source can be determined.

In still further implementations, such as when a supersonic rifle produces bullet and muzzle sounds, processing virtual sensor features regarding a reflecting barrier can assist in lifting the left-right ambiguity in shooting direction, and/or assist in measuring the decay of a bullet, improve weapon classification, etc.

In one general implementation, consistent with aspects of the present innovations, reflections (echoes) that heretofore had been ignored or underutilized are used to augment a source location solution. Each reflecting surface potentially provides a "Virtual" Sensor that can augment the acoustic array hence facilitating the location computation or improving its accuracy without adding more physical sensors. The reflecting surfaces give a second audio path (an echo) to the sensor in addition to the direct path, and if the geometry of the surface is known or can be surmised, this echo adds to the knowledge of the source location. One illustration of such concepts is presented graphically in FIG. 1 where a straightforward geometry for a Virtual Sensor is illustrated in 2 dimensions.

Figure 1:
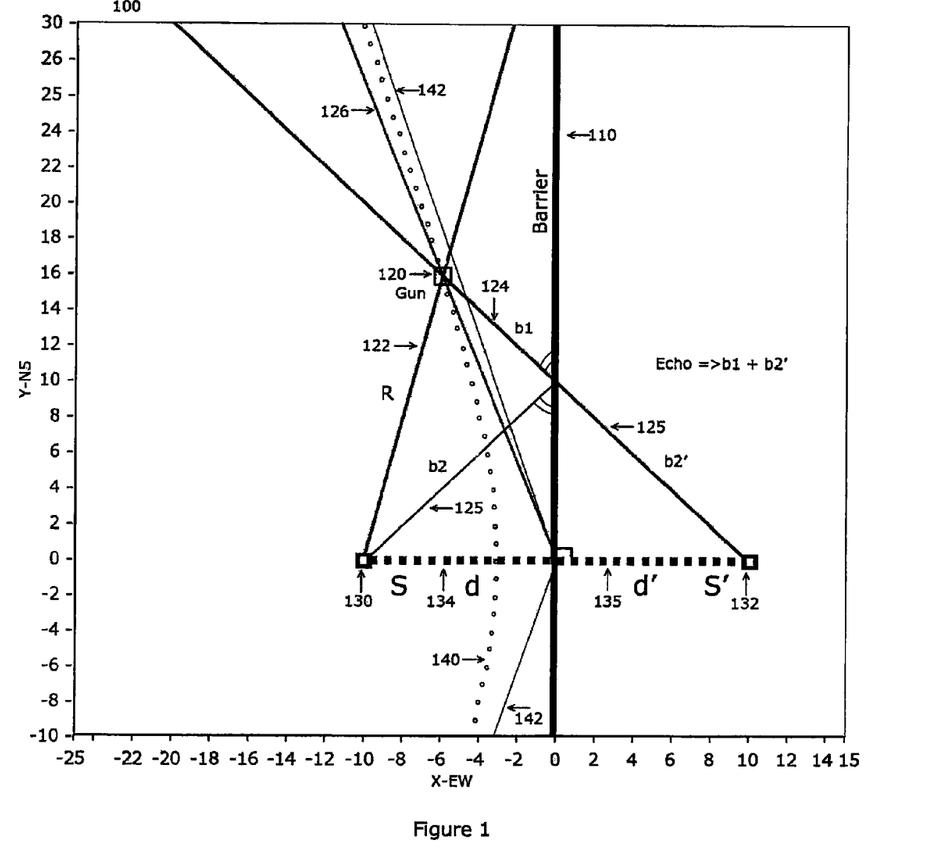
FIG. 1 is a top view illustrating an exemplary representation showing a reflecting barrier and virtual sensor geometry, consistent with certain aspects related to the innovations herein.

FIG. 1 is a top view illustrating an exemplary representation showing a reflecting barrier 110 and virtual sensor geometry, consistent with certain aspects related to the innovations herein. Referring to FIG. 1, a reflecting barrier 110 shown with respect to an acoustic source at 'Gun' 120, which produces an impulse travelling outward in all directions is illustrated. Sensor S 130 receives a direct and a reflected impulse 124, 125. The virtual sensor is at the point set back behind the barrier where a soundwave would have intersected an imputed sensor if the barrier were not there. At Sensor S the two arrival times correspond to the direct path R 122, and an echo which travels a distance b1+b2 (124+125), which is equivalent to having a Virtual Sensor S' 132 at a distance d=d' (134=135) behind the barrier. The actual and virtual echoes follow b1+b2 and b1+b2'.

As shown in FIG. 1, the Virtual Sensor S' and the actual sensor S are a pair of sensors which can define a hyperbola 140 on which the source must be located when the arrival time difference $\Delta t$ between the two arrivals is used. That hyperbola is presented along with the straight asymptotic lines 142 of the hyperbola. If the only information available is the $\Delta t$ and distance d, then the source can be determined to be on or somewhat to the side of the asymptotes. The speed of sound c is assumed to be known. At source distances much greater than the standoff distance d, the source will be quite close to the asymptote at the asymptotic angle. The actual direction of the source from the barrier point closest to the sensor is show as line 126 which is, e.g., close to an asymptote.

When the angle to the source can be measured at S, then the direction to the source is known, and in that case the range R can also be calculated by placing the location at the previously calculated hyperbola. For sources at a large distance, the azimuthal measurement may not assist much in defining the range as the error in that measurement may be greater than the angle between the asymptote and the hyperbola. So for a distant source only the angle can be determined (along the asymptote 142), but for a close source the actual location can be measured.

Figure 2:
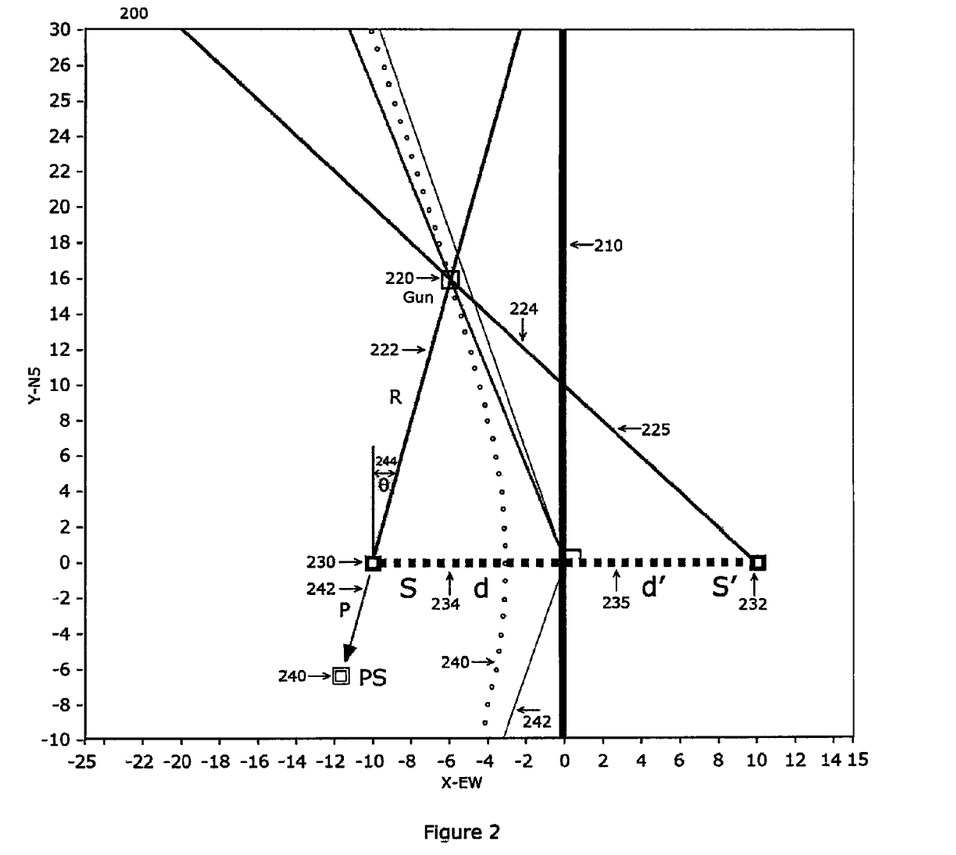
FIG. 2 is a top view illustrating an exemplary representation showing angle measurement(s) and a single pseudo sensor, consistent with certain aspects related to the innovations herein.

To facilitate computation of the location, which in this case uses one relative time and an absolute azimuthal angle, we make use of the concept of a "Pseudo" Sensor as taught, e.g., in the parent applications such as U.S. Pat. No. 7,474,589. The pseudo sensor method is illustrated in FIG. 2 below, which is a modification of FIG. 1, but augmented with the Pseudo Sensor PS 240. Although not strictly necessary to use, the pseudo-sensor concept may impart additional innovation since algorithms are available using a matrix of sensor positions and vector of arrival times to calculate locations in 2D or 3D. Without use of pseudo-sensors, a mixed calculation requiring both angle and time inputs to the location routine is necessary, and that can be quite cumbersome.

FIG. 2 is a top view illustrating an exemplary representation showing angle measurement(s), both sensor and virtual sensor, and a single pseudo sensor, consistent with certain aspects related to the innovations herein. Referring to FIG. 2, a pseudo sensor (PS) 240 may be placed a distance p 242 from S away from the source at a measured angle $\theta$ 244. Were a sensor actually to be placed at PS, it would receive an impulse at a time p/c after the impulse arrived at S. The pseudo sensor may be placed in line with the incoming acoustic wave, allowing an AOA to be converted into a TOA measurement, hence simplifying the location calculation. Now the location can be calculated from the three arrival times at S 230, S' 232, and PS 240, using standard multilateration routines.

In addition to the information illustrated above, one more piece of information is likely to be available, the angle to the echo, $\theta'$. This will allow a second pseudo-sensor to be used, PS'. Now there are four data values to be considered; if their use produces a consistent location, then the location can be considered to be 'confirmed.' (In the sense first taught in U.S. Pat. No. 5,973,998, Showen & Dunham, 1997, wherein an additional consistent data point guards against random sounds producing a false location.)

Figure 3:
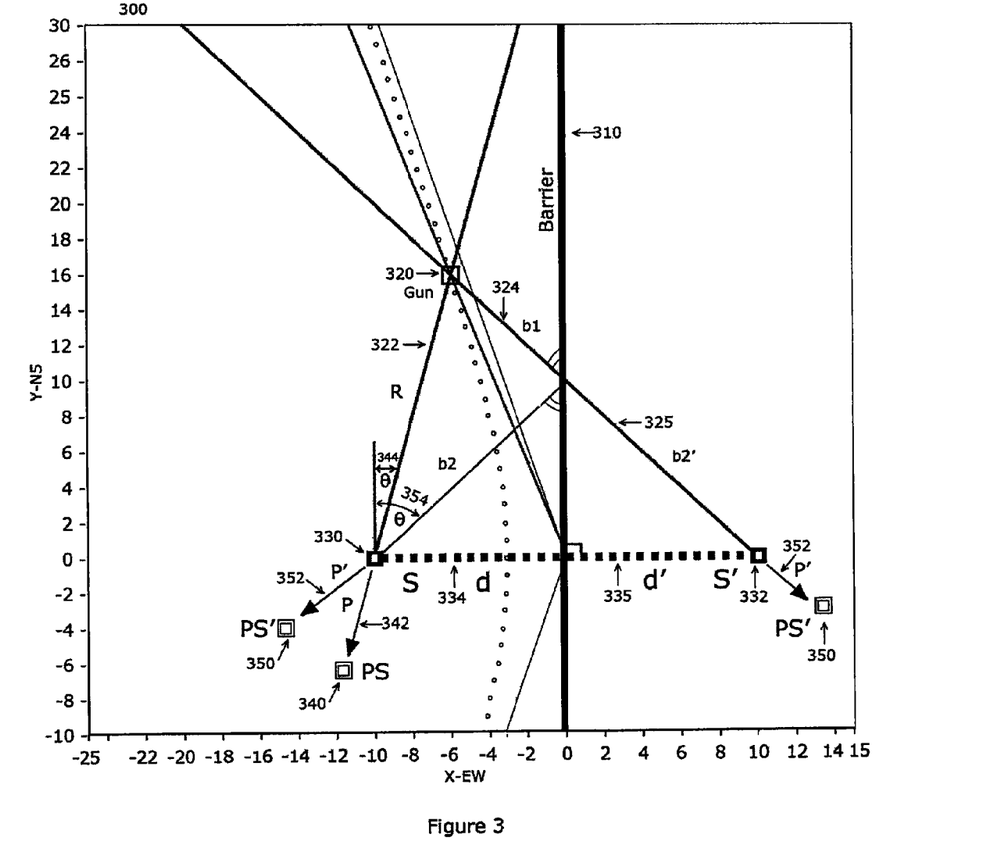
FIG. 3 is a top view illustrating another exemplary representation showing an additional pseudo sensor plus a virtual sensor, consistent with certain aspects related to the innovations herein.

FIG. 3 is a top view illustrating another exemplary representation showing an additional pseudo sensor plus a virtual sensor, consistent with certain aspects related to the innovations herein. Referring to FIG. 3, the addition of a second pseudo-sensor, PS' 350, is illustrated. Here, then, the four sensors S 330, S' 332, PS 340, and PS' 350 with their relative times allow calculation of a 'confirmed' location at the gun. Note PS' is shown on each side of the barrier to show the geometric symmetry.

A special case is next considered where the range from a source to a sensor is known. One exemplary scenario where the range could be known is when the arrival time of a muzzle optical flash is measured with respect to the arrival time of the direct muzzle acoustic sound. Here the optical transit time can be neglected and the range R (item 322 from FIG. 3) is known, given the speed of sound c. The present virtual sensor innovations can then determine (or confirm) the angle to the source using direct and reflected acoustic arrivals. This requires solving the triangle GSS' (320, 330, 332) for the angle θ 344, or rather for its complement, (90−θ). If, as may often be the case, the gun is further from the barrier than sensor S 330, the angle solved will be (90+θ). All three sides of GSS' are known: by definition R; the double distance from the barrier 2d (334+335); finally the echo path b1+b2 (324+345) is larger than R by an amount corresponding to the measured delayed echo arrival Δt. The law of cosines then gives the relation to be solved as $$(R+c*\Delta t)^2 = R^2 + (2d)^2 - 2*(2d)*R*\cos(90 \pm \theta).$$

As seen from this example, in the case of a known range, the virtual sensor innovations herein allow determination of the angle to the source.

Furthermore, if a circumstance occurs where the angle to the direct impulse and the angle to the echo could be measured but the difference of arrival times cannot be measured, then virtual sensor innovations herein enable, via processing of intersecting beams, determination of the source location or source location information. Referring to FIG. 3, the angles measured are angles 344 and 354, and the intersecting beams thereto give a location, unless the distance to the source is very large in relation to the accuracy of the angular measurements.

In exemplary implementations, the reflection geometry (distance and angle to the barrier) should be known in order to implement aspects of the virtual sensor innovations herein. This can be determined in various ways if it is not known a priori. The reflection opportunities near a fixed sensor are more likely to be known than for a mobile sensor. A vehicle carrying an acoustic sensor might in addition carry a laser or ultrasonic distance-measuring device to determine the horizontal range to a reflector. The angle to the reflector could be determined by rotating the device to obtain the minimum distance. An elevated sensor could use a similar device or an altimeter to determine the height above ground. In certain circumstances, the data itself may allow an unknown reflection geometry to be determined, and an iterative method could be implemented to arrive at a consistent solution. That is, the partially unknown reflector position parameters could be varied iteratively along with trial locations to obtain a best-fit solution.

In certain implementations, there sometimes are practical problems to overcome in determining precisely the time differences between impulses. If the signal-to-noise-ratio (SNR) is large, then the pulse onset times can generally be accurately measured. When the SNR is small, then the use of autocorrelation between the pulses potentially is more accurate as then the total power in the two pulse signals can be used, rather than just the signal power comprising the pulse onset. At times transforming broad pulses with a confined frequency extent can be analyzed in the frequency domain—in that case the phase between the two pulses can be representative of the time delay.

The geometry presented so far has been of a vertical barrier or reflector Innovations herein are equally applicable when the reflector is horizontal (e.g., the ground, etc.), and an elevation angle instead of an azimuthal angle is determined. The reflection in this case gives an apparent vertical extent to the array, which can enable sources above the physical array to be located. For example, the height of a sniper in a multistoried building can be determined using a virtual sensor. Or the elevation angle of an aircraft can be measured.

Figure 4:
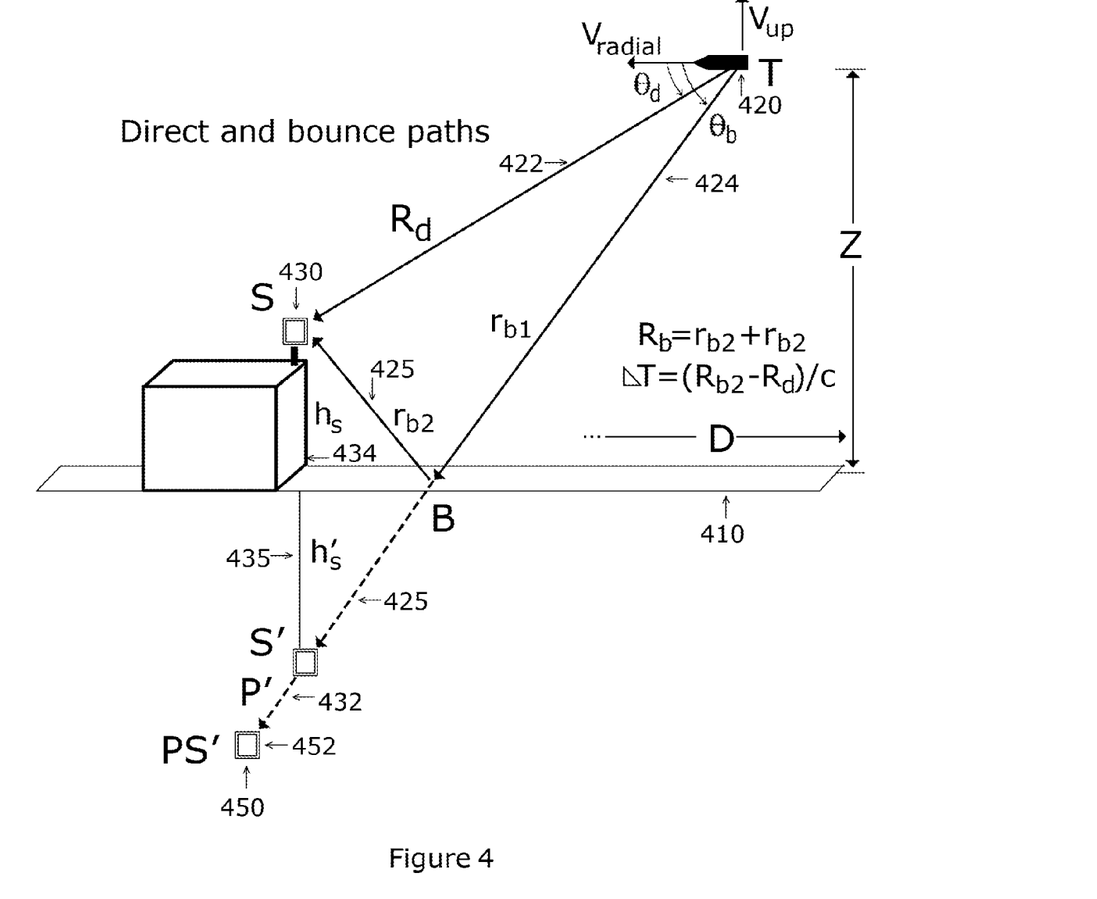
FIG. 4 is a side view illustrating an exemplary representation showing an elevated sensor with moving elevated target, consistent with certain aspects related to the innovations herein.

FIG. 4 is a side view illustrating an exemplary representation showing an elevated sensor with moving elevated target, consistent with certain aspects related to the innovations herein. Referring to FIG. 4, a moving, elevated source (target T) is illustrated. In implementations here, for example, calculations involving the direct and bounce paths allow the velocity component of the target to be determined. In a representative implementation, for example, a helicopter with radial velocity $V_{radial}$ 428 (wrt the illustrated sensor) and upward velocity $V_{up}$ 426 is given. The sensor S 430 is on a building a distance $h_s$ 434 above the reflecting surface/ground 410; the target T 420 is above ground an amount Z, and at a horizontal distance D. As can be seen, here, sensor S elevated on building observes the direct acoustic path 422 and the bounce acoustic path 424/425 from target. Further, Doppler shifts measured from a moving source are different on direct and reflected paths, allowing horizontal and vertical velocity components to be determined.

In this example, physical sensor S with angle measuring capability has a Virtual sensor S' 432 directly below it a distance $h_s$ 435 beneath the ground, and a Pseudo-sensor PS' 430 is placed back from sensor S' an arbitrary distance p' 452 opposite from the measured bounce path direction. A potential PS in line with the direct path is not shown. The measured angles at S plus the difference in arrival times Δt allow solution of the triangle hence giving the two depression angles. The two acoustic paths (direct and bounce) impinging on the sensor will give Doppler shifts corresponding to components of the source velocity given by $$\text{Direct path } V_d = V_{radial}*\cos(\theta_d) + V_{up}*\cos(\theta_d + 90).$$

$$\text{Bounce path } V_b = V_{radial}*\cos(\theta_b) + V_{up}*\cos(\theta_b + 90)$$

Given the measured $V_d$, $\theta_d$, $V_b$, and $\theta_b$, the radial and upward velocities can be calculated from the above two formulas. If there are one or more additional sensors displaced horizontally from the single sensor illustrated, then the radial velocity can be resolved into the horizontal X and Y components of the velocity.

For a target with an intrinsic frequency $f_0$, the actual received frequency for a given path must be added to the received Doppler offset, hence for the two paths the received frequencies become:

$$f_d = f_0 + V_d/c \text{ and } f_b = f_0 + V_b/c$$

where the Doppler correction is the ratio of a velocity component of the paths $V_d$ or $V_b$ divided by the speed of sound, c. For a helicopter the frequency $f_0$ is the blade rate, typically 9 to 18 Hz, which is a constant for a given helicopter class flying horizontally. Besides the familiar case of a helicopter having a distinct frequency, other distinct-frequency sources include train horns, factory whistles, car alarms, or sirens. If the $f_0$ is known beforehand, then it can be subtracted from the above formulae giving $V_d$ and $V_b$ directly (which allows calculation of the target velocity). If the $f_0$ is not known, its value can be estimated from the measured $f_d$ and $f_b$ values to make all values consistent. This may require observation in time as the target moves and the angles change.

Figure 5:
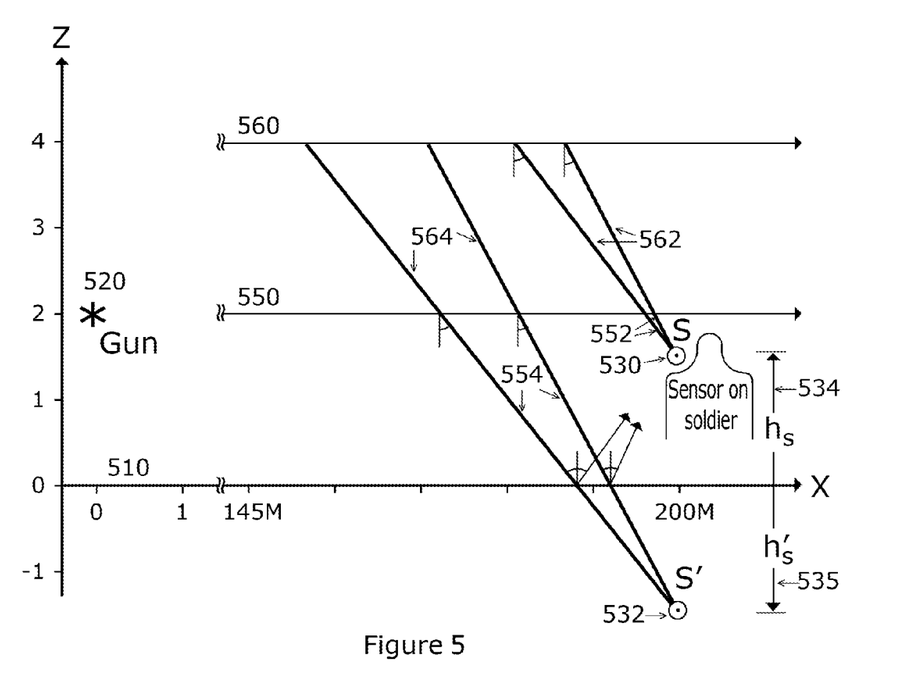
FIG. 5 is a side view illustrating an exemplary representation showing direct and ground-bounce bullet sound paths, consistent with certain aspects related to the innovations herein.
Figure 6:
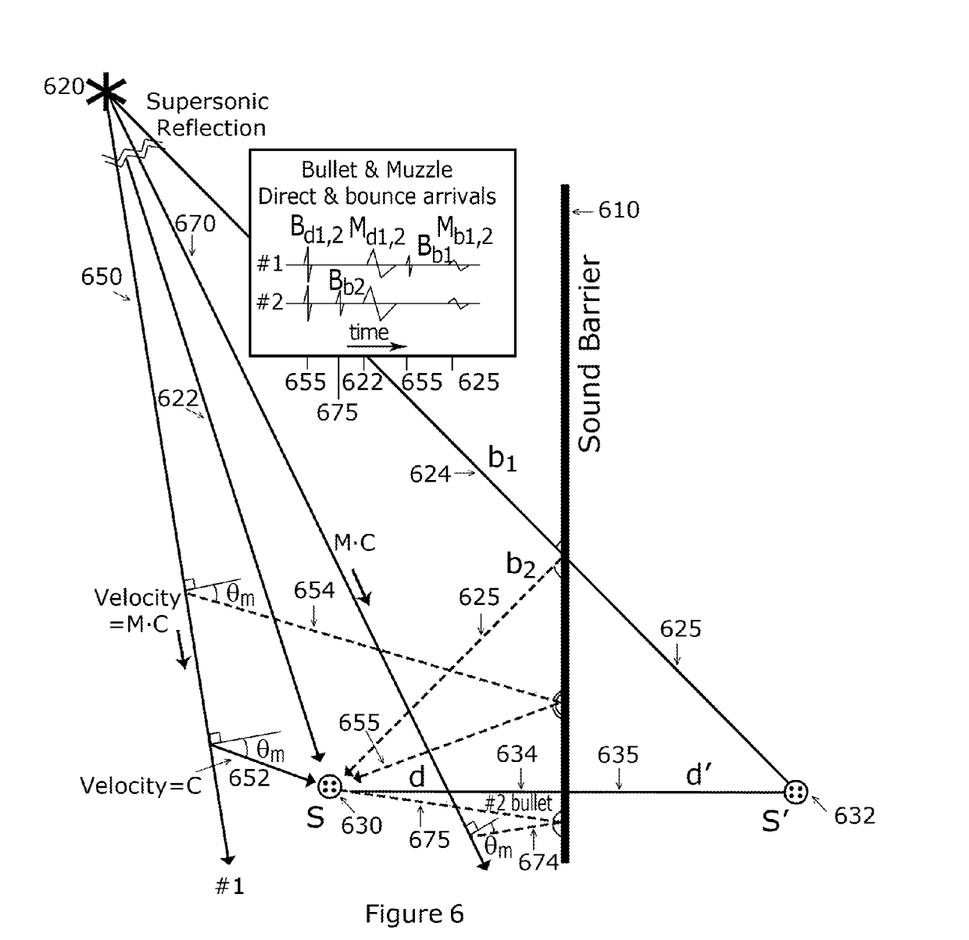
FIG. 6 is a top view illustrating an exemplary representation showing geometry of supersonic reflections, consistent with certain aspects related to the innovations herein.

At times gunshot location or sniper detection systems can hear the sounds of supersonic bullets if they pass close enough to the sensors. The bullet sounds, together with the muzzle sounds, can be used in certain favorable geometries to determine the direction of the shot and the distance to the shooter. The bullet sound (a crack) will arrive before the muzzle sound (a bang) at a given sensor. The directions to these sounds are not the same: while the muzzle sound direction points back to the shooter, the bullet sound will 'hop off' of the supersonic bullet at that place which allows the sound to arrive at the observer in the minimum possible time. Hence the bullet sound arrives at the observer obliquely—this geometry is illustrated in FIGS. 5 and 6 below.

Gustaysen U.S. Pat. Nos. 5,912,862 and Duckworth 6,178,141 introduce the 'crack-bang' solution wherein a single angular-measuring sensor may be used to give the direction and range to a shot. Such solutions are referred to as 'crack-bang' in that the arrival times and directions of bullet and muzzle sounds may locate the source in certain favorable geometries.

The Mach number M is the ratio of the bullet velocity to the speed of sound, having values typically between 2 and 3. The angle beyond perpendicular at which the sound hops off the bullet toward an observer (sensor) is the Mach Angle ($\theta_m$) given by $\sin^{-1}$ (1/M). The bullet sound arrival angle at the sensor is dependent on the direction of the shot and $\theta_m$.

The reflecting surfaces often encountered in scenarios with supersonic bullet sounds are both horizontal (from the ground) and vertical (from a nearby building).

FIG. 5 is a side view illustrating an exemplary representation showing direct and ground-bounce bullet sound paths, consistent with certain aspects related to the innovations herein. Referring to FIG. 5, sounds emanating from a supersonic bullet have direct and ground-bounce paths which a Virtual Sensor can assist in processing. The additional time delay of the bounce path directly relates to height of bullet, and the measured angle gives the bullet velocity at the jump off point. In an illustrative implementation consistent with FIG. 5, for example, the single sensor S 530 may here be mounted on a soldier at height $h_s$=1.5 m 534 above the surface/ground 510. In this example, a gun 520, two-hundred meters to the left, fires a bullet either horizontally 550 at a height of 2 m or at a slightly elevated path 560 aimed 4 m above the ground at the soldier's distance. Here, e.g., the gun is either an AK-47 or an M-16 with Mach angles of 37.9° or 28.5° at the 200 m range. The sensor S has an associated virtual sensor S' 532 at a distance $h_s$' 535 below ground. The direct paths for the weapon arrive as shown along 552 562 (level or elevated paths); ground bounce paths are shown as 554 or 564.

Consistent with the above discussions, muzzle echoes may be used to advantage in processing features of the innovations herein (e.g., giving an approximate direction to the source, etc). Further benefits can be found using the bullet echoes. Here, for example, as a bullet passes close by an elevated sensor, direct and a bounce paths for the bullet sounds are created. A sensor on a vehicle or a person will often receive both paths with only a few ms difference between them, depending on the height and the Mach number. The existence of the bounce path can assist in the differentiation between muzzle pulses and bullet pulses.

There is a possibility of confusion due to the echoes, especially if their arrivals overlay the direct signals. If there is rapid fire this is more likely to happen; but the additional information in the echo timings can be beneficial.

Two complications often arise: the bullet slows as it progresses along its trajectory, resulting in a changing $\theta_M$, and the muzzle cannot always be clearly distinguished from the bullet sounds, especially if the bullet is not very close to the sensor. However, innovations herein with knowledge of the geometry of the structures producing the echoes and hence the expected arrival times of those echoes may permit disentanglement of the various arrivals—Bullet and Muzzle sounds for both direct and bounce paths. Also, since the Mach number may not be known a priori, the bounce geometry measurements together with the direct paths allow determination of that parameter.

FIG. 6 is a top view illustrating an exemplary representation showing geometry of supersonic reflections, consistent with certain aspects related to the innovations herein. Referring to FIG. 6, geometry of supersonic reflections are illustrated. For example, a rifle 620 may shoot in a first direction 650 or a second direction 670. The direct and reflection paths are shown for the muzzle and bullet sounds, and their relative arrival times are presented. Note, from the time line box inserted in FIG. 6, that the arrivals of the Muzzle times 622 are independent of the direction of the first and second shot paths. However the Bullet sound arrivals are very dependent on the shot direction; in fact the building-bounced Bullet sound can arrive earlier or later than the direct Muzzle sound. Note also that the two shot directions #1 and #2 have the same arrival time of the direct Bullet sound(s) 652. The direct jump-off path to sensor S 630 from direction #2 is omitted as it would have obscured the muzzle bounce path $b_z$ 625. Hence there is an intrinsic left-right ambiguity in knowing the shot direction from timing data alone. That ambiguity can be lifted either with the measurement of Bullet sound arrival direction or by using the bounce arrival times from the Virtual Sensor S' 632. The direction #2 bullet bounce paths 674, 675 arrive earlier than the path #1 bounces, lifting the left-right shot ambiguity.

If the bullet is decaying noticeably in velocity during this interval, then the decay rate might be extracted from the relative arrival times, when the arrival angles are also measured. That decay rate together with measuring M may permit classification or identification of the weapon or munitions.

Figure 7:
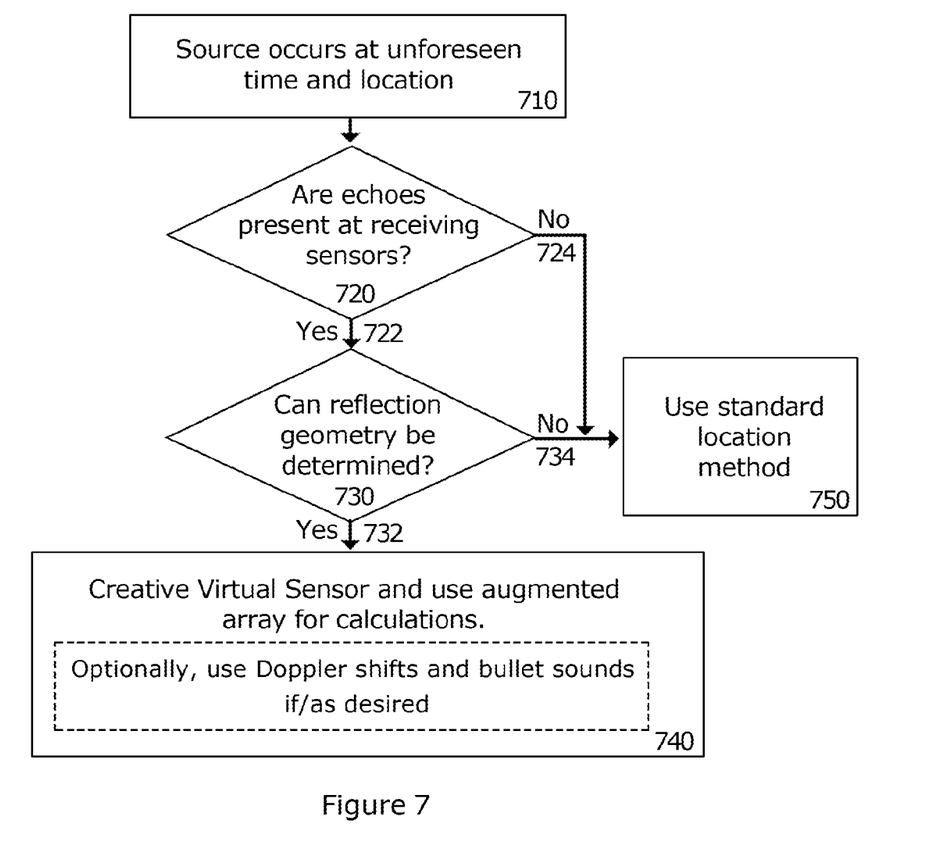
FIG. 7 is a diagram illustrating one exemplary flow of a virtual sensor system operation, consistent with certain aspects related to the innovations herein.

Some exemplary aspects of weapon fire processes including echoes are now described. FIG. 7, for example, is a diagram illustrating one exemplary flow of a virtual sensor system operation, consistent with certain aspects related to the innovations herein. FIG. 7 is a diagram illustrating one exemplary flow of a virtual sensor system operation, consistent with certain aspects related to the innovations herein. Referring to FIG. 7, a logic diagram of an exemplary virtual sensor process is shown. Here, for example, if echoes are present and the reflection geometry is understood, an augmented array can be constructed. This augmented array can give improved location and velocity determination. In the drawing, a shot or acoustic source first occurs 710. If echoes 720 are present 722 and the geometry 730 is known 732 the augmented array 740 can be used.

Figure 8:
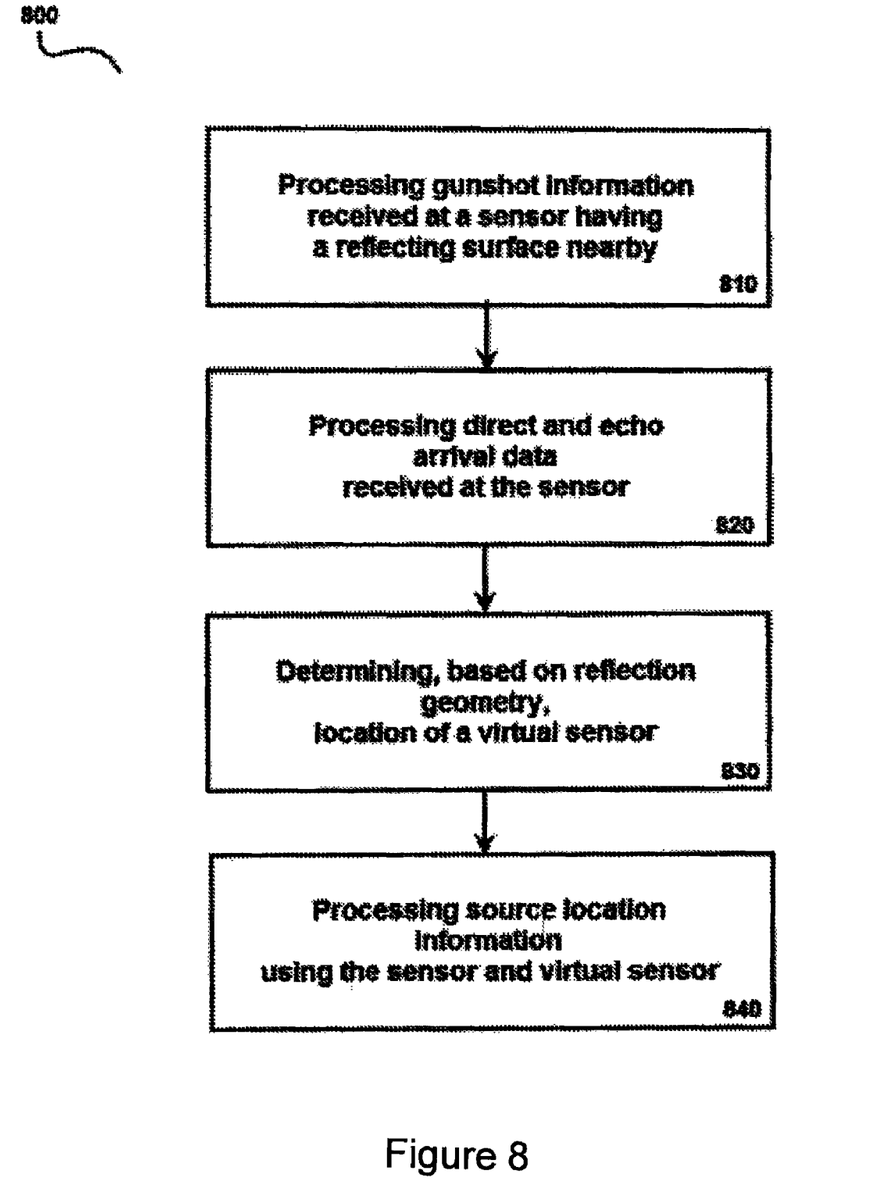
FIG. 8 is a flow diagram of exemplary virtual sensor processing, consistent with certain aspects related to the innovations herein.

FIG. 8 is a flow diagram of exemplary virtual sensor processing, consistent with certain aspects related to the innovations herein. In some implementations, Such methods may include processing gunshot information to determine source location information involving echo/reflection processing features. As shown in FIG. 8, one exemplary method may include processing gunshot information received at a sensor having a reflecting surface within relevant/operational range 810, processing direct arrival time and echo arrival time information received at the sensor 820, determining, based on reflection geometry, a location of a virtual sensor 830, and processing source location information as a function of a virtual sensor 840. Referring to details of one such implementation, a method of processing gunshot information may comprising processing gunshot information received from a source at a sensor, wherein the sensor has a reflecting surface at a given distance, verifying that both a direct arrival time, direct to the sensor from the source, and an echo arrival time, indirectly to the sensor off the reflecting surface, are measurable, creating, when both direct and echo arrival times can be measured, a virtual sensor, wherein the virtual sensor is positioned on a line perpendicular to a plane surface passing through the sensor on a side of the plane surface opposite that of the sensor, at a distance equal to the given distance behind the plane surface, processing or calculating, via use of an array comprising the sensor and the virtual sensor, source location information.

Figure 9:
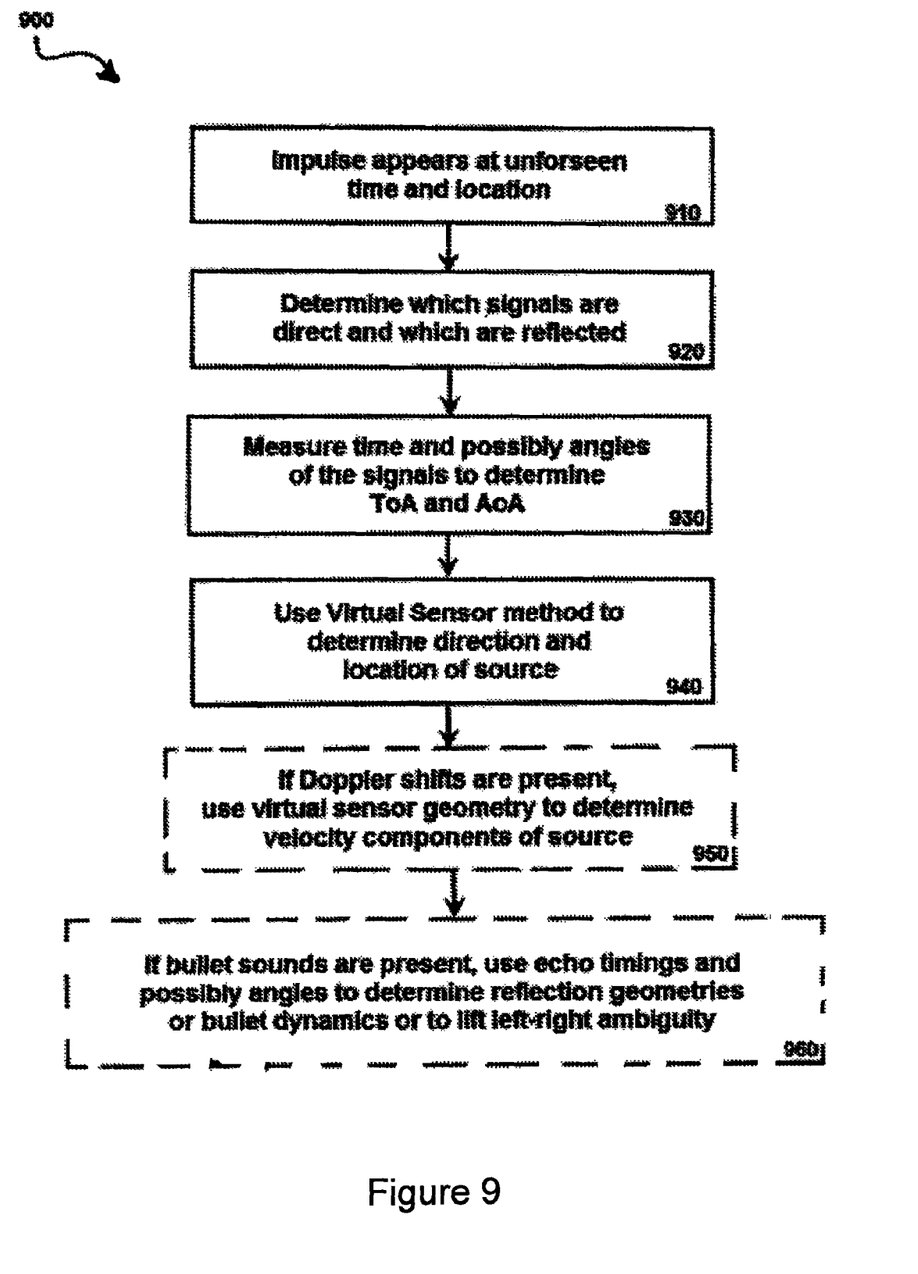
FIG. 9 is a flow diagram of exemplary virtual sensor processes, consistent with certain aspects related to the innovations herein.

FIG. 9 is a flow diagram of exemplary virtual sensor processes, consistent with certain aspects related to the innovations herein. Referring to FIG. 9, an exemplary process may commence upon occurrence/detection of an acoustic impulse 910. The arrival times usually allow determination of which signals are direct and which signals are reflected 920. The measured times (and in some cases angles) determine time-of-arrival (TOA) and angle-of-arrival (AOA) 930 information/processing. Given the geometry of the sensors and reflectors, such virtual sensor methods may improve determination of the direction and/or location of the source 940. In a first optional step 950, if Doppler shifts are present, then they can be used to determine velocity components of the source.

In another optional step 960, if bullet sounds are present and can be distinguished as such in contrast to muzzle sounds, the reflected impulses may even be used to calculate, more correctly the geometries, the bullet dynamics, and/or to eliminate left-right shot direction ambiguities.

Additionally, the innovations herein may be achieved via implementations with differing components that perform or process data consistent with the innovations herein. With regard to such other components (e.g., circuitry, computing/processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to, various clock-related circuitry, such as that within personal computers, servers or server computing devices such as routing/connectivity components, hand-held or laptop devices, multiprocessor systems, microprocessor-based systems, set top boxes, smart phones, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular control, delay or instructions. The inventions may also be practiced in the context of distributed circuit settings where circuitry is connected via communication buses, circuitry or links. In distributed settings, control/instructions may occur from both local and remote computer storage media including memory storage devices.

Innovative circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, implementations and features consistent with the present inventions may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the appended claims and the applicable rules of law.

We claim:

1. A method of processing gunshot information comprising:
    processing gunshot information received from a source at a sensor, wherein the sensor has a reflecting surface at a given distance;
    verifying that both a direct arrival time, direct to the sensor from the source, and an echo arrival time, indirectly to the sensor off the reflecting surface, are measurable;
    creating, when both direct and echo arrival times can be measured, a virtual sensor, wherein the virtual sensor is positioned on a line perpendicular to a plane surface passing through the sensor on a side of the plane surface opposite that of the sensor, at a distance equal to the given distance behind the plane surface;
    processing or calculating, via use of an array comprising the sensor and the virtual sensor, source location information.

2. The method of claim 1 wherein the source location information includes one or both of time of arrival (ToA) and/or angle of arrival (AoA) data, which provide better estimates of a direction and/or or distance to the source.

3. The method of claim 1 wherein the sensor is an omnidirectional sensor.

4. The method of claim 1 wherein the sensor has an angle measuring capability.

5. The method of claim 4 wherein the angle measuring capability measures azimuth and/or elevation angles.

6. The method of claim 1, wherein a vertical reflecting surface is used to create an array having a horizontal extent, which gives improved azimuth angular resolution.

7. The method of claim 1, wherein a horizontal reflecting surface is used to create an array having a vertical extent, which gives improved elevation angular resolution.

8. The method of claim 1, further comprising analyzing difference in arrival times as compared to distance between the sensor and the virtual sensor and determining a location of the source on a hyperbola on the array axis.

9. The method of claim 1 further comprising, when the source is determined to be very distant from the two-element array, providing an asymptote to a hyperbola of the array axis as the estimate of the direction to the source.

10. The method of claim 1 wherein the source location information includes a range from the sensor to the source.

11. The method of claim 1 wherein the source location information includes a direction to the source.

12. A method of processing gunshot information comprising:
    processing gunshot information received, from a source, at:
    an optical sensor, which measures an optical muzzle flash time of arrival (ToA); and
    an acoustic sensor that has a reflecting surface at a given distance;
    creating, when both direct and echo arrival times can be measured, a virtual sensor, wherein the virtual sensor is positioned on a line perpendicular to a plane/surface passing through the sensor on a side of the plane/surface opposite that of the sensor;
    determining, via creation of a two-element array using the sensor and the virtual sensor, source location information.

13. The method of claim 12 wherein a range to the source is determined using relative times of arrival of the optical and the direct acoustic impulses.

14. The method of claim 12 wherein an angle to the source is determined using the law of cosines on a triangle consisting of the source, the sensor, and the virtual sensor.

15. The method of claim 1 further comprised of using one or more sensors, virtual sensors and/or pseudo sensors to calculate intersecting hyperbolas to define the location of the source.

16. The method of claim 1 further comprised of using one or more sensors, virtual sensors and/or pseudo sensors to calculate the location of the source using a multilateration routine.

17. A method of processing gunshot information comprising:
    processing supersonic gunshot information received from a source at a sensor, wherein the sensor has a reflecting surface at a given distance;

verifying that direct arrival times, direct to the sensor from the source, and echo arrival times, indirectly to the sensor off the reflecting surface, are measurable for both the muzzle blast (bang) and supersonic bullet sounds (crack);

creating, when both direct and echo arrival times can be measured, a virtual sensor, wherein the virtual sensor is positioned on a line perpendicular to a plane/surface passing through the sensor on a side of the plane/surface opposite that of the sensor, at the given distance;

estimating/calculating, via use of an array including the sensor and the virtual sensor, an approximate direction from the sensor to the source via a crack-bang solution, such that left-right shooting direction ambiguity may be removed.

18. The method of claim 17 when the reflector is ground, and determining that the presence of the ground-based echo at a compatible time difference confirms that the impulse is originating from the bullet and is not from the muzzle.

19. The method of claim 17 wherein height of the sensor above the ground is constrained and/or measured via ground-bounce timing.

20. The method of claim 17 wherein the measured angles of the direct and bounced paths from the bullet sound measures the Mach angle hence the velocity at the hop-off location is determined and this allows a better estimate of the initial velocity and the weapon type.

* * * * *